(12) United States Patent
Manas-Zloczower et al.

(10) Patent No.: US 11,339,268 B2
(45) Date of Patent: May 24, 2022

(54) ONE-STEP, SOLVENT-FREE METHOD FOR RECYCLING AND REPROCESSING THERMOSET POLYMERS WITH TUNABLE PROPERTIES

(71) Applicant: CASE WESTERN RESERVE UNIVERSITY, Cleveland, OH (US)

(72) Inventors: Ica Manas-Zloczower, Cleveland, OH (US); Liang Yue, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 18 days.

(21) Appl. No.: 16/942,935

(22) Filed: Jul. 30, 2020

(65) Prior Publication Data
US 2021/0032432 A1 Feb. 4, 2021

Related U.S. Application Data

(60) Provisional application No. 62/880,219, filed on Jul. 30, 2019.

(51) Int. Cl.
*C08J 11/16* (2006.01)
*C08J 11/24* (2006.01)

(52) U.S. Cl.
CPC .............. *C08J 11/16* (2013.01); *C08J 11/24* (2013.01); *C08J 2363/00* (2013.01); *C08J 2401/02* (2013.01)

(58) Field of Classification Search
USPC .................................................... 521/40, 176
See application file for complete search history.

(56) References Cited

U.S. PATENT DOCUMENTS 10,155,842 B2 * 12/2018 Duquenne ............ C08G 59/685
10,457,806 B2 10/2019 Groote
2018/0312657 A1 11/2018 Yue

OTHER PUBLICATIONS

Liang Yue, "Vitrimerization: A Novel Concept to Reprocess and Recycle Thermoset Waste via Dynamic Chemistry", Global Challenges, Wiley-VCH Verlag GmbH & Co. KGaA, 2019.

* cited by examiner

*Primary Examiner* — Terressa Boykin
(74) *Attorney, Agent, or Firm* — McDonald Hopkins LLC

(57) ABSTRACT

Thermosetting plastics are recycled by process that begins with grinding the plastic into small pieces. This particulate is then mixed with a catalyst and ball mill milled to a fine powder, which can then be reprocessed via molding (e.g., hot-press, injection, etc.).

27 Claims, 7 Drawing Sheets

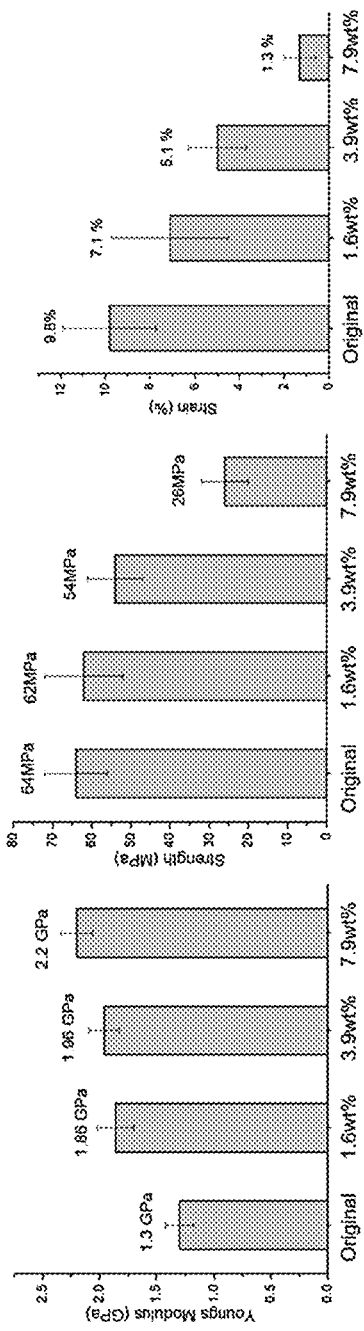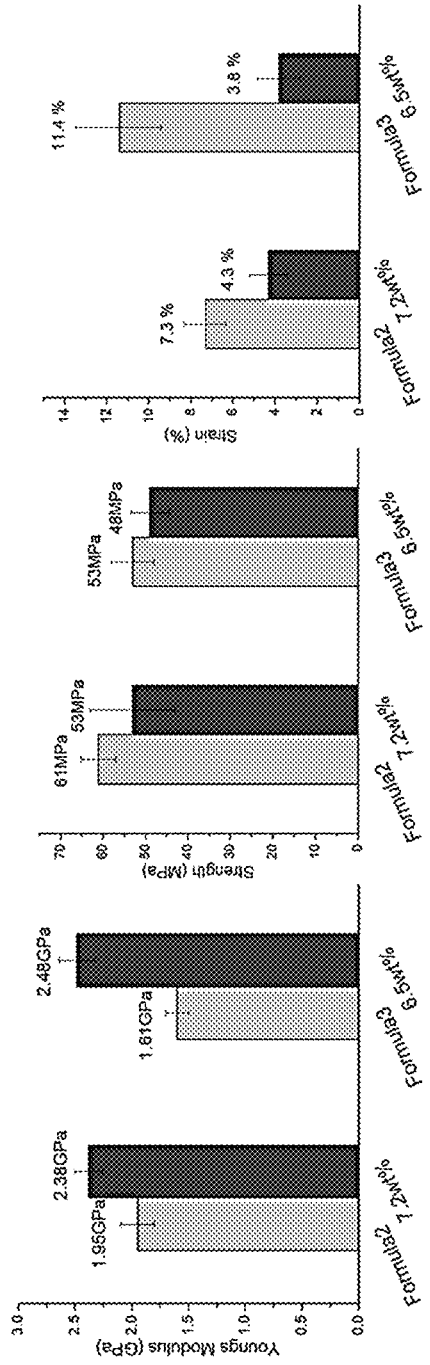
FIGURE 7A  FIGURE 7B  FIGURE 7C
FIGURE 8A  FIGURE 8B  FIGURE 8C

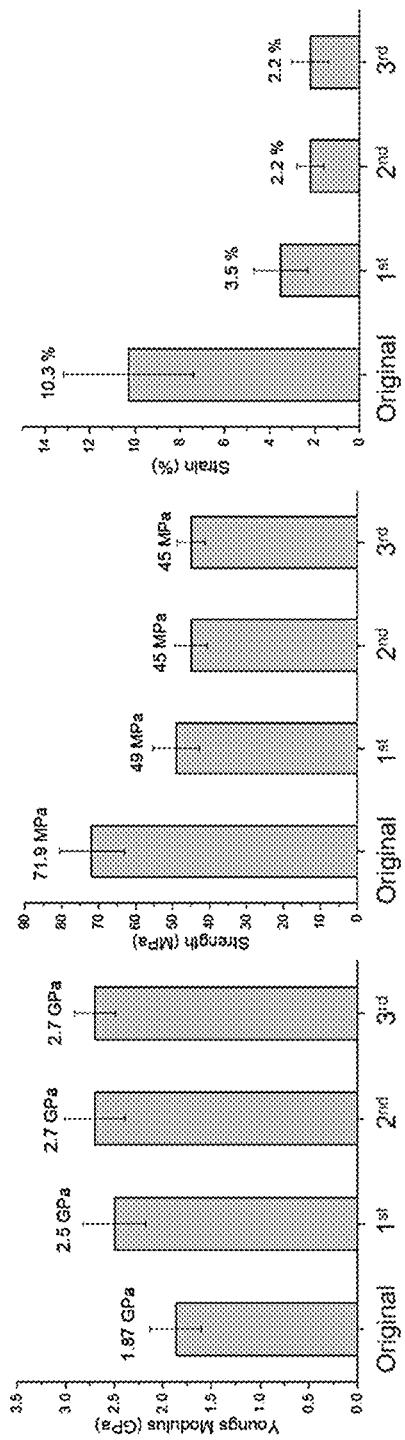
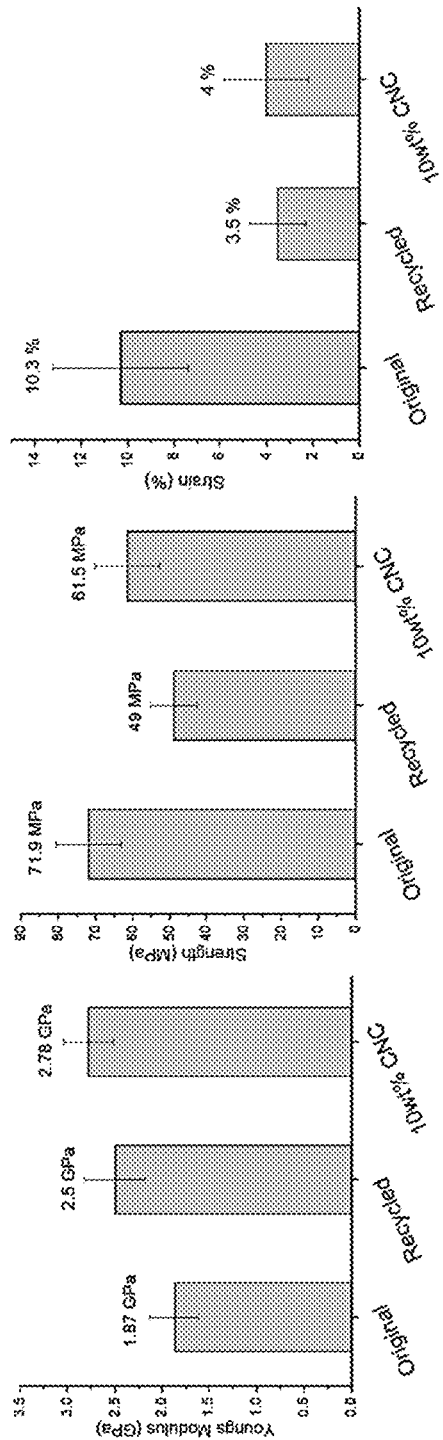
FIGURE 12A  FIGURE 12B  FIGURE 12C
FIGURE 13A  FIGURE 13B  FIGURE 13C

ONE-STEP, SOLVENT-FREE METHOD FOR RECYCLING AND REPROCESSING THERMOSET POLYMERS WITH TUNABLE PROPERTIES

REFERENCE TO RELATED APPLICATION AND TECHNICAL FIELD

This application claims priority to U.S. provisional patent application Ser. No. 62/880,219 filed on Jul. 30, 2019, which is incorporated by reference herein.

This application relates generally to methods of recycling polymers and, more specifically, to methods and processes in which thermosetting polymers are recycled and reprocessed by changing the permanent covalently cross-linked networks in these polymers into dynamic, cross-linked networks via grinding in the presence of a catalyst, followed by heating, extrusion, injection molding, and/or compression molding.

This invention was made with government support under OISE-1243313 awarded by the National Science Foundation. The government has certain rights in the invention.

BACKGROUND

Thermosets are covalently cross-linked networks that, unlike thermoplastics cannot be reprocessed by melting or dissolution in any solvents. These networks can exhibit a glass transition temperature ($T_g$) lower than the designed application service temperature (elastomer/rubber) or higher than the service temperature (thermoset resins). Thermoset rubbers find applications in the automotive industry (interiors, bumpers), biomedical devices, bedding, furniture, packaging, gaskets, O-rings and so on. Non-limiting examples of such thermosetting polymers include various epoxy, polyurethane, and other similar resins, which are usually polymerized or copolymerized into cross-linked plastics, elastomers, and the like.

Usually thermoset resins exhibit significant benefits in comparison with thermoplastics exhibiting dimensional stability, high mechanical properties, high thermal/creep/and chemical resistance, durability. This class of polymers maintain their structural strength, thermal and electrical resistance characteristics during prolonged use. Thermosets find many industrial uses as coatings, adhesives but also in fiber reinforced composites for many high-tech applications. Composites high stiffness and strength in combination with their light weight make them play a vital role in the clean energy production (e.g. wind turbine blades, hydrokinetic power generation, support structures for solar systems and their encapsulations, and geothermal energy production) manufacturing of lighter vehicles (automotive, airplanes, trains, boats and aerospace) for reduced fuel consumption. There are many other applications requiring high structural strength and durability, thermal and corrosion resistance, such as structural materials for buildings, pipelines, industrial equipment and/or their components for instance heat exchangers, light-emitting diode lenses, fly-wheels for electricity grid stability, containers, or off-shore structures in which composite materials are the material of choice.

Despite the great features of thermosets, they are typically produced in relatively small quantities and are expensive. Their main advantage, which is retaining a lasting and intractable three-dimensional structure, creates also a crucial disadvantage since they cannot be recycled or reprocessed. Recent efforts have been devoted to trying to induce re-formability and healing in chemically cross-linked polymer networks by using exchangeable chemical bonds that yield a dynamic cross-linked network. Polymeric systems containing such exchangeable bonds are covalent adaptable networks (CANs). Depending on the exchange mechanism, CANs can be classified to two different categories.

The first category of CANs comprises networks where the exchange mechanism of crosslinks is dissociative. For such networks, most of the cross-links break under certain conditions (temperature, UV-light exposure, pH) and re-form again with a change in the conditions. These type of adaptive networks show a sudden and significant decrease in the viscosity, with breaking the cross-linking bonds.

In the second category, the mechanism of crosslinking is associative. Here, crosslinking bonds do not break until a new bond forms, which makes the network permanent and dynamic.

Vitrimers are polymeric associative CANs that have permanent networks and demonstrate a gradual viscosity decrease upon heating, which is a distinctive character of vitreous silica. By definition, vitrimers are polymeric networks made with covalent crosslinking. The crosslinking bonds of such networks have an associative nature which results in the ability of material to change its topology via exchange reactions. These reactions are triggered by heat, which causes a gradual decrease in system viscosity with increasing temperature and provides malleability to the network. The viscosity of vitrimers is governed by the chemical exchange reaction at elevated temperatures and like silica and, unlike dissociative networks and thermoplastics, decreases gradually. Vitrimers maintain permanent network at all temperatures until degradation, and they can swell but not dissolve in specific solvents. However, swelling ratios are higher for these networks in comparison with the non-dynamic ones.

Due to importance of polymer recycling, scientists are interested in the concept of designing materials based on cradle-to-cradle life cycle. Dynamic networks offer the opportunity to design materials considering the cradle-to-cradle concept. However, such systems do not exhibit properties at par with thermosets and are sometimes prone to early degradation. Application of such networks is restricted at high temperatures.

United States Patent Publication 2018312657 describes a reprocessing methodology for use on thermosets. An associative dynamic bonding scheme relies on swelling the thermoset network in a solution containing a catalyst, thereby allowing dynamic bond exchange between ester and hydroxyl groups. The resulting vitrimerized thermosets can be processed according to common thermoplastic manufacturing techniques. The entirety of this publication is incorporated by reference.

U.S. Pat. No. 10,457,806 discloses methods for preparing and subsequently using "pre-dynamic" cross-linked polymer compositions. These compositions are formed by combining finely divided powders of linear epoxy- and polyester-containing polymers with a transesterification catalyst in an extruder at temperatures up to 320° C. These compositions are precursors of vitrimers and require further curing (e.g., such as at temperature from about 50° C. up to 250° C. or more preferably exceeding the gel point of the resin) in order to create an actual, dynamic, cross-linked polymer composition. As such, the pre-dynamic compositions are proposed as a replacement for conventional thermoset materials, which characterized as not reprocessible and not recyclable.

In view of the foregoing, a solvent-free process for recycling thermosetting polymers would be welcomed. More particularly, a process that can be adjusted to account for different grades of thermoset and/or separate, anticipated uses for the recycled/reprocessed materials is also needed.

SUMMARY OF INVENTION

Operation of the invention may be better understood by reference to the detailed description, drawings, claims, and abstract—all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

BRIEF DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

FIGS. 7A through 7C are data plots showing the effects of catalyst concentration on various tensile properties of the recycled thermosets, including Young's Modulus (FIG. 7A), strength (FIG. 7B), and strain (FIG. 7C) all as measured according to accepted laboratory procedures.

FIGS. 8A through 8C are comparative data plots showing the original and recycled tensile properties for different thermoset formulations, including Young's Modulus (FIG. 8A), strength (FIG. 8B), and strain (FIG. 8C) all as measured according to accepted laboratory procedures similar to those for the values reported in FIGS. 7A through 7C.

FIGS. 12A through 12C are comparative data plots showing the effects on tensile properties of multiple recycling and reprocessing sequences (e.g., original material, $1^{st}$ cycle, $2^{nd}$ cycle, etc.) of a recycled thermoset material according to various aspects disclosed herein, including Young's Modulus (FIG. 12A), strength (FIG. 12B), and strain (FIG. 12C) all as measured according to accepted laboratory procedures similar to those for the values reported in FIGS. 7A through 7C.

FIGS. 13A through 13C are data plots showing the reinforcement effect of cellulose nanocrystals (CNC) on tensile properties of a recycled thermoset material according to various aspects disclosed herein, including Young's Modulus (FIG. 13A), strength (FIG. 13B), and strain (FIG. 13C) all as measured according to accepted laboratory procedures similar to those for the values reported in FIGS. 7A through 7C.

DETAILED DESCRIPTION OF THE INVENTION

While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Generally speaking, the inventors have discovered a simplistic method for recycling heretofore unprocessable thermoset resin compositions through the careful selection of materials and processing conditions. Significantly, the processing conditions do not require the handling or use of solvents, thereby representing a significant improvement over the aforementioned approach in which catalysts are dissolved in a solution so as to induce swelling in the thermoset and expedite the overall recycling process.

Figure 1A:
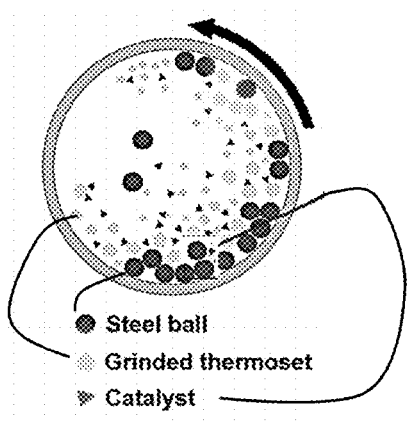
FIGS. 1A through 1D are schematic representations of the sequential steps according to certain aspects of the invention disclosed herein, with FIG. 1A representative of high energy ball milling, FIG. 1B showing breaking and welding of the particles, FIG. 1C illustrating the recycled fine powder, and FIG. 1D indicating hot press molding.
Figure 1B:
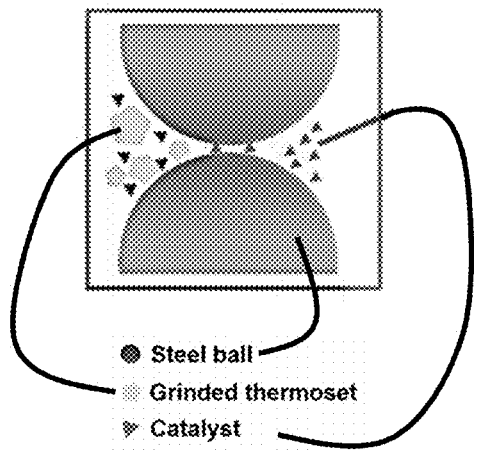

FIGS. 1A through 1D schematically represent the basic steps involved in recycling and reprocessing the thermoset waste. The waste is first grinded into small pieces and mixed with catalyst particles in a suitable mill, such as a rotating drum with steel balls and/or other appropriate media as illustrated in FIG. 1A. The rotational movement (shown by the arrow) ensures that the milling media (black circles representing steel balls) is intimately mixed with thermoset particulates (gray pentagons) and catalyst particles (black triangles). The rotation both promotes mixing and, owing to the collisions between particles, particulates, and/or the milling media, crushes and reduces the size of the particulates and forms metal-polymeric ligand sites (as shown in FIG. 2C). While a rotating drum is schematically illustrated, any conventional milling apparatus may suffice, while the steel balls may be replaced or augmented by other common milling media (provided that the milling media itself does not disintegrate or otherwise introduce unwanted materials). The milling media must be sufficiently durable to grind and pulverize the particles and particulates and impart the energy required to form the metal-polymeric ligand sites.

A suitable catalyst is chosen based on the chemistry of the thermoset network. In this example, zinc acetate is used as catalyst for the polyester type thermoset, which can undergo transesterification reaction. Zinc acetate is often used to catalyze such transesterification reactions in epoxy vitrimers owing to its comparatively low cost, nontoxicity, and high efficacy, and metal-ion coordination interactions in such systems are well known.

Generally, the catalyst can be chosen from metal salts of zinc, tin, magnesium, cobalt, calcium, titanium and zirconium. A catalyst with lower activation energy is preferred since it leads to faster transesterification kinetics. The catalyst may also be chosen from catalysts of organic nature, such as but not limited to, benzyldimethylamide, and benzyltrimethylammonium chloride. The catalyst should be chosen such as to have a sufficiently high degradation temperature to minimize deactivation/loss of the material under the expected milling conditions. Non-limiting examples may include: tin(II) 2-ethylhexanoate, 1,5,7-triazabicyclo[4.4.0]dec-5-ene (TBD), zinc(II)acetate (Zn(OAc)$_2$), triphenylphosphine (PPh$_3$), dibutyltin bis(2-ethylhexanoate), dibutyltin diacetate, dibutyltin dilaurate, dibutyltin bis(2,4-pentanedionate), titanium 2-ethylhexanoate, monobutyltin oxide, and zinc octoate.

The catalyst is utilized in an amount sufficient to produce a vitrimer having desired properties. Specific, non-limiting amounts of catalyst that have been found effective include 1.6, 3.9, and 7.9 parts by weight of catalyst per 100 parts of mixture to be milled (i.e., thermoset water and catalyst combined). Thus, the catalyst may be provided at 1.5 wt. % or more, 4.0 wt. % or more, less than 8.0 wt. %, less than 10.0 wt. %, and any range of values bounded by these upper and lower limits. Advantageously, the amount of catalyst should be minimized or at least selected to balance against processing times and costs (as the catalyst may be more expensive to procure than the thermoset waste material).

By action of the milling, the catalyst becomes intimately mixed with the small pieces of thermoset waste. The waste (and, possibly, the catalyst) are reduced in size in order to generate fine powder mixture at 100% yield. This procedure called "vitrimerization" generates vitrimerized resin, which can be reprocessed via hot-press molding or injection molding, similar to known vitrimer-type materials.

Figure 1C:
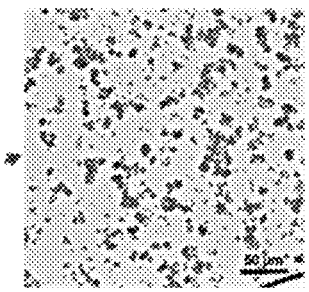
Figure 1D:
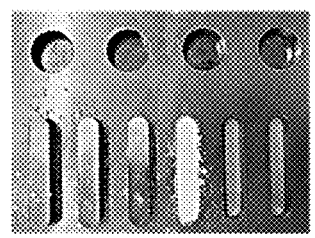

FIGS. 1C and 1D are, respectively speaking, schematic representations of the fine powder mixture and a hot pressing procedure which can used to form the powder mixture into recycled components. These steps are subsequent to formation of the catalyst-ligand complex that enables recycling of the powder created by FIGS. 1A and 1B (and as is schematically shown in FIG. 2C).

Fine powder will be understood to describe the comparative particle size. Powder is significantly smaller in average particle size and distribution in comparison to grinding. Both techniques are known in the art.

More specifically, fine powders are particles that flow freely when poured. In some aspects, substantially all of the material passes through a at least a no. 355 and/or a no. 180 sieve (i.e., both as per ISO standard 565-1972), meaning that substantially all particulates are smaller than the respective aperture sizes of 0.355 mm and/or 0.180 mm found respectively in such sieves.

Figure 2A:
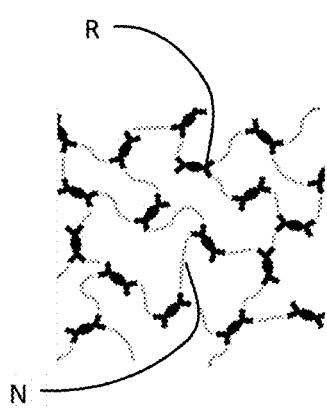
FIGS. 2A through 2C are schematic illustrations of network changes during the recycling and reprocessing of thermoset as an original composition (FIG. 2A), during the vitrimerization process (FIG. 2B), and as a final vitrimer with a dynamic network (FIG. 2C).
Figure 2B:
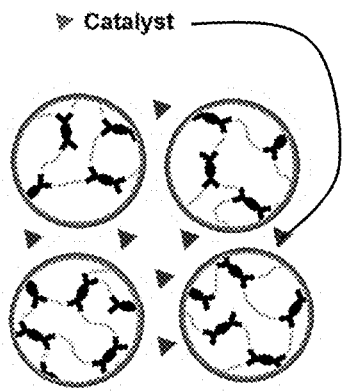
Figure 2C:
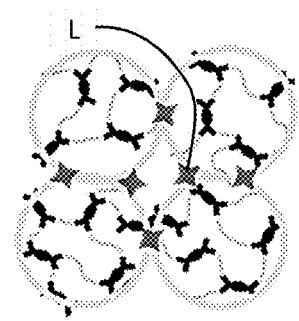
Figure 3A:
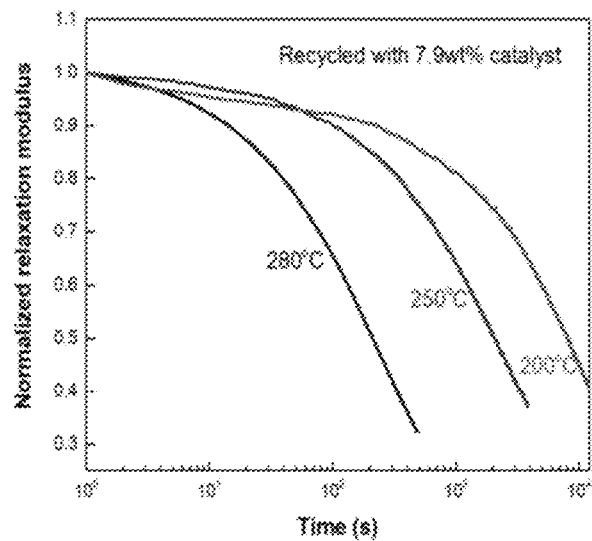
FIGS. 3A and 3B are data plots showing the effects of temperature (FIG. 3A) and catalyst concentration (FIG. 3B) on the stress relaxation of the vitrimerized thermoset.
Figure 3B:
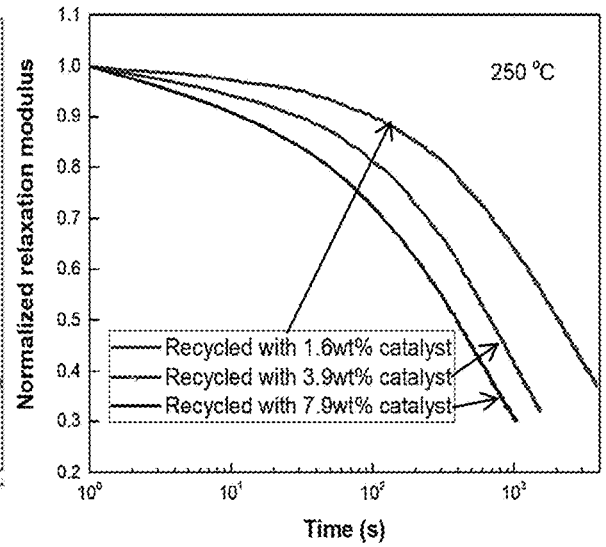

FIGS. 2A through 2C represent the structural aspect involved in the recycling process contemplated herein. The original or previously processed thermoset material (FIG. 2A) includes a regular and ordered network of bonds N connecting discrete resin components R. As the milling/grinding produces powder, network N is fractured into smaller pieces (particularly by rupturing relative weak bonding sites, e.g., as might be expected between zinc-oxygen bonds, etc.). The catalyst (black triangles) also becomes interspersed within these smaller pieces. In effect, this increases the surface area of the thermoset waste (i.e., the collection of resin R) as the powder is formed owing to high shear stress of the milling process (FIG. 2B).

Through this solid state, mechano-chemical vitrimerization process, a portion L of the catalyst forms a ligand with the resin R (in the examples where zinc acetate or other metal-containing catalysts are used, metal-polymer ligands are formed) as seen in FIG. 2C. The points indicated by reference elements L serve as substitutionally labile cross-link sites within the vitrimerized network and as junctions for the transesterification reactions, which enables the formation of a new dynamic network. Thus, the reprocessed thermoset is transformed into a vitrimer-type polymer, as seen in FIG. 2C. In turn, this vitrimer-type polymer can be reprocessed as suggested by FIG. 1D or as is otherwise known in the art.

Notably, once the vitrimer-type polymer is formed, it can be reprocessed and recycled without adding more catalyst. Dynamic analysis, including the data below, indicates the vitrimer-type polymer exhibits comparable characteristics to the original/"virgin" thermoset material. Also, its structure can easily accommodate nanofillers, such as cellulose nanocrystals (CNCs) or other similar fillers, to enable mass production of nanocomposites having improved material properties. The vitrimer-type polymers herein could also be used for fabricating fiber-reinforced composites. Finally, the vitrimer-type polymers herein convert a previously permanent, three-dimensional thermoset network into a vitrimer that is appropriate for repeated recycling.

With reference to the remaining data plots in FIGS. 3A through 12C, it will be understood that the temperatures, times, and other values disclosed in each plot are expressly disclosed in writing as part of this specification. Further, not only can values be discerned or extrapolated from these plots, they should also be understood in a comparative sense, at least with respect to those depicting different or sequential compositions. Lastly, where figures may have been subdivided into discrete charts (e.g., FIGS. 3A, 3B, and 3C), these plots may be collectively referred to by the number only for the sake of brevity (e.g., FIG. 3).

FIG. 3 illustrates the effect of temperature and catalyst concentration on the transesterification reaction rate in an epoxy/anhydride thermoset material recycled with a zinc acetate catalyst. Increasing the temperature or the catalyst concentration will enhance the transesterification reaction, which can be observed by the increased stress relaxation. Thus, by controlling the reprocessing temperature or catalyst loading, the transesterification reaction rate can be controlled.

The transesterification reaction rate will also depend on the ratio of hydroxyl to ester groups in the original thermoset system. Thus, in one aspect, the ratio of hydroxyl to ester groups is measured and/or selected in the thermoset waste material prior to milling, so as to inform the amount of catalyst and/or time required during milling.

Figure 4:
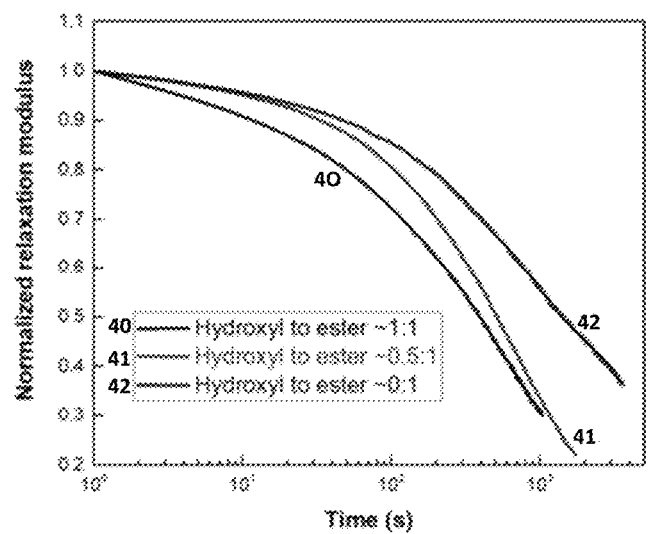
FIG. 4 is a data plot showing the effect of free hydroxyl to ester ratio in the original thermoset on the stress relaxation of the recycled systems at 250° C.

FIG. 4 demonstrates that for three different epoxy/anhydride resin formulations with varied hydroxyl to ester group ratio in the cross-linked networks, the same methodology can be applied to convert the thermoset into dynamic network. The original thermoset with a hydroxyl to ester group ratio of 1:1 can be recycled with 7.9 wt. % zinc acetate, while a material with ratio of 0.5:1 (i.e., 1:2) was recycled with 7.2 wt. % zinc acetate and a starting material with only trace amounts of hydroxyl to ester (i.e., a ratio of <0.1:1) was recycled with 6.5 wt. % zinc acetate. All such materials exhibit acceptable properties upon being recast (i.e., hot pressed or injection molded) as recycled materials after processing.

Accordingly, in certain aspects, a hydroxyl:ester ratio of at least 1:2, less than 1:1, greater than 1:10, and less than 1:10 may form the upper and/or lower limits of the thermoset waste material selection parameters. More generally, the thermoset may comprise detectable amounts of both hydroxyl and ester groups to ensure the efficacy of the catalyst.

Figure 5:
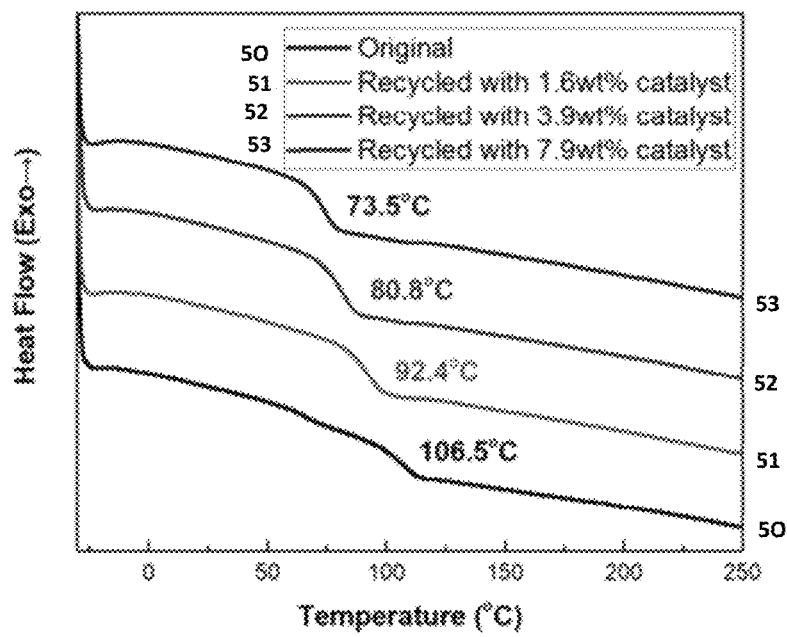
FIG. 5 is a data plot showing the effect of catalyst content on glass transition temperature of recycled thermoset.
Figure 6:
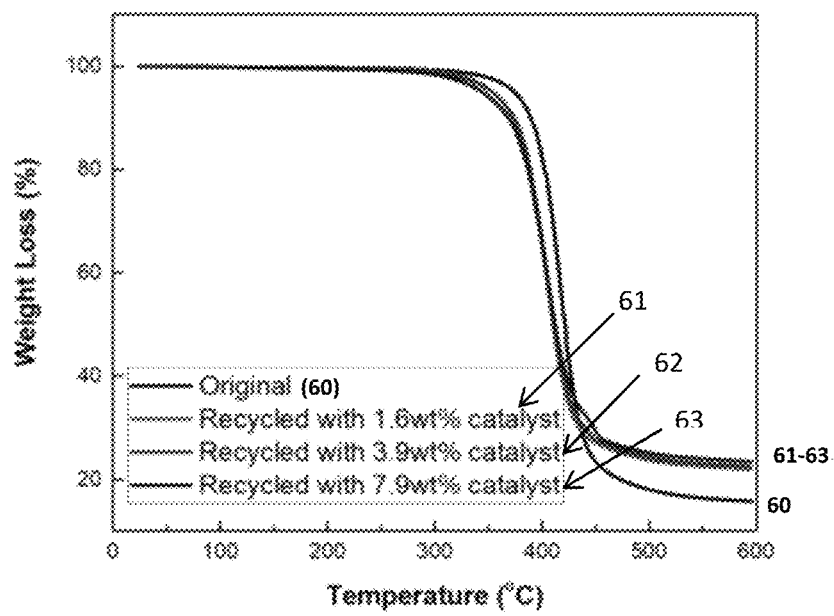
FIG. 6 is a data plot showing the effect of catalyst concentration on the thermal stability of the recycled thermoset.

FIG. 5 displays the glass transition temperature (Tg) of recycled epoxy/anhydride thermoset. Increasing the catalyst loading will clearly decrease the Tg. Thermal stability of the recycled thermoset will slightly decrease with increasing the catalyst concentration, but not significantly as seen in FIG. 6. Thus, the recycled material performs at a comparable level as compared to the original thermoset, at least with respect to Tg and thermal stability.

FIG. 7 illustrates that the mechanical properties of the recycled epoxy/anhydride materials can be tuned by changing catalyst loading. Young's modulus of the recycled materials is even higher than the original thermoset. The recycled materials have more rigid networks at room temperature than the original epoxy/anhydride networks. With less catalyst loading, more tensile strength could be recovered after recycling and reprocessing. In this manner, the mechanical properties of the recycled thermoset may be tuned by controlling the catalyst loading during processing.

Figure 9A:
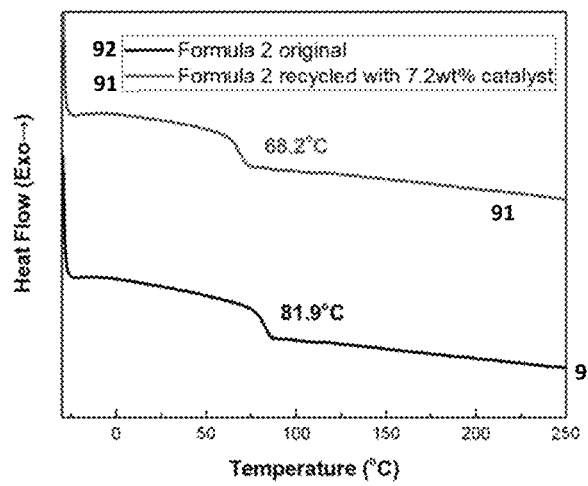
FIGS. 9A and 9B are comparative data plots showing the original and recycled system glass transition temperature for different thermoset formulations.
Figure 9B:
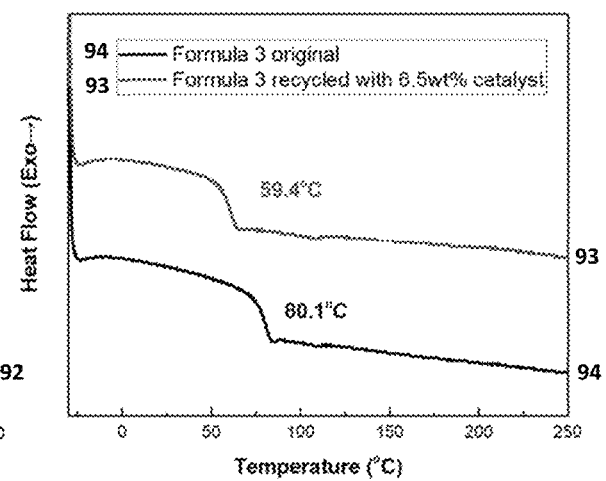
Figure 10A:
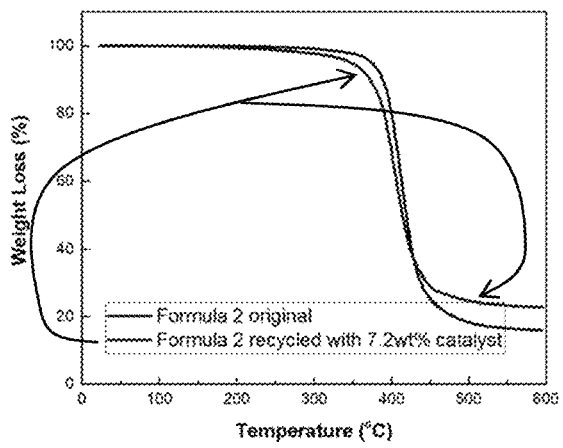
FIGS. 10A and 10B are comparative data plots showing the original and recycled system thermal stability for different thermoset formulations.
Figure 10B:
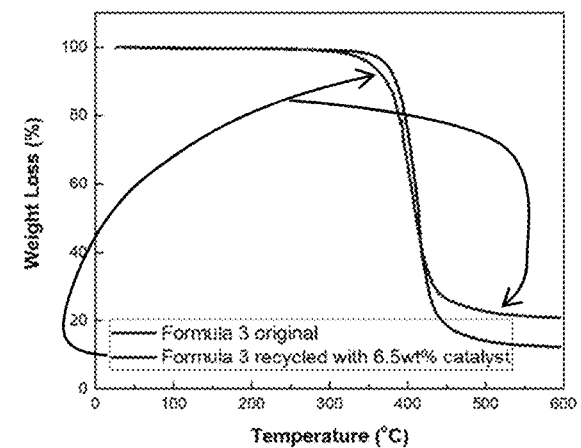

FIGS. 8, 9 and 10 illustrate, following the same trend, that the Tg, thermal stability and mechanical properties are all tunable by simply controlling the catalyst loading during the recycling processing, regardless of the original formulation of the epoxy/anhydride thermoset. Here, the results for two formulas with different free hydroxyl to ester group ratio are demonstrated.

The one-step solvent-free methodology illustrated here for thermoset systems using for vitrimerization the transesterification reaction, can be applied to recycle any type of polyester thermoset polymer, including epoxy/acid thermoset, epoxy/anhydride thermoset, polyurethane thermoset, and vinyl ester thermoset. More specifically, the thermoset waste should include at least one crosslinked thermoset polymer capable of forming a vitrimer composition. For example, crosslinked thermoset polymers include, but are not limited to, polyester based polyurethane, epoxy, polyesters and any crosslinked network which has ester groups on the backbone of the polymer as well as available OH groups on the structure.

Figure 11:
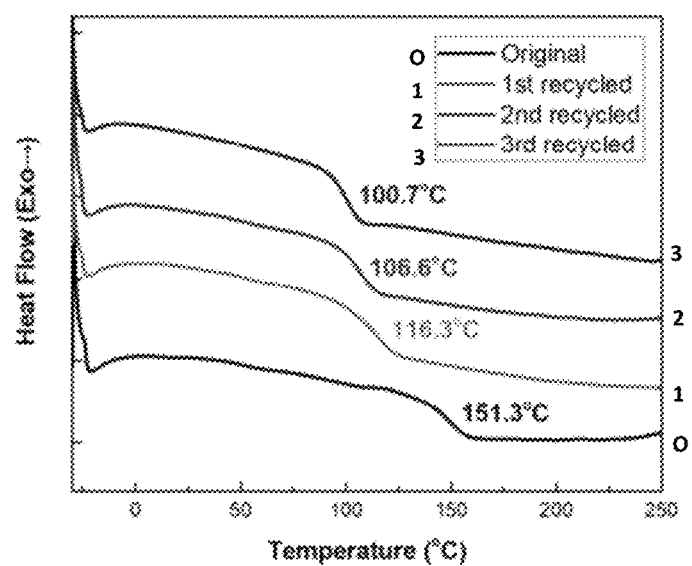
FIG. 11 is a data plot showing the effect of multiple recycling and reprocessing on the glass transition temperature of the recycled thermoset.

To further demonstrate the process, a commercial epoxy/anhydride formulation (Epon 828 resin, methylhexahydrophthalic anhydride hardener and 1-methylimidazole accelerator) was recycled with 5.4 wt % zinc acetate catalyst using the invented methodology and reprocessed multiple times as contemplated in FIGS. 11 and 12. Once the crosslinked network is "vitrimerized" into a dynamic network, it becomes recyclable and reprocessable for multiple cycles without adding more catalyst.

FIG. 11 illustrates the effect of multiple recycling on the system Tg (there is a slight decrease in Tg with multiple recycling). However, after three times reprocessing, the recycled thermoset retains almost the same mechanical performance as the original recycled thermoset as displayed in FIG. 12.

The invented methodology can be also applied to manufacture nanocomposites by simply adding the appropriate nanofillers with the thermoset waste and catalyst during the ball milling processing. Thus, properties like electrical or thermal conductivity, fire retardancy, electromagnetic shielding can be imparted on the composite with the appropriate filler selection. The high shear stress could efficiently disperse the nanofillers into the polymer without any dispersion agent. Nanocomposites produced by the invented methodology could also avoid the re-aggregation or phase separation of the nanofillers, generally present in traditionally manufactured thermoset resin nanocomposites involving filler dispersion in a liquid phase.

FIG. 13 is an example of recycling the commercial epoxy/anhydride formula with cellulose nanocrystals (CNC) to reinforce the mechanical properties of the recycled thermoset. With 5.4 wt % zinc acetate as catalyst and 10 wt % CNC as filler, the recycled epoxy shows a 50% increase in modulus and recovers 85% of the tensile strength of the original thermoset.

Advantages of the disclosed method include the elimination of any solvents. Further, ball milling can be achieved at low temperatures (i.e., without the need for providing external sources of heat and typically lower than 300° C. or less). Milling operations can be engineered to incorporate batch or continuous feed processes, with the latter requiring material feed rates to be controlled in combination with the milling conditions to ensure sufficient resident time is achieved in the mill, with gravity-induced inclines, rotation of the milling chamber, and/or release valves providing further measures of control.

Example

Zinc acetate, bisphenol A diglycidyl ether (DGEBA), glutaric anhydride and imicla7ole were purchased from Sigma-Aldrich. 2,2-Diphenyl-1-picrylhydrazyl (DPPH free radical) was purchased from Alfa Aesar. Copper(I) chloride (99.99%) was purchased from Strem chemicals. Cellulose nanocrystals (CNC) were purchased from Cellulose Lab.

An epoxy anhydride thermoset was then prepared. DGEBA (1 eq. epoxy groups), glutaric anhydride (0.5 epoxy equivalents) and imicla7ole (3 wt % to DGEBA) were homogeneously mixed and cured at 120° C. for 8 hours and at 160° C. for another 8 hours to ensure complete crosslinking.

The cured thermoset epoxy was then prepared for vitrimerization. First, approximately 10 g of thermoset was grinded into small particles and then ball milled (Fritsch pulverisette 6) with zinc acetate (2 mol, 5 mol and 10 mol % with respect to the hydroxyl groups) for 1 hour at a speed of 600 rpm yielding vitrimerized epoxy fine powders. For vitrimerization with cellulose nanocrystals, 2 mol % zinc acetate and 10 wt % CNC were ball milled with cured epoxy under identical conditions. All vitrimerized samples were compression molded at 250° C. and 5 MPa for 1 hour.

The vitrimerized epoxy dry powders were sandwiched between two plates using a stainless steel compression mold and pressed at 250° C. and 5 MPa pressure for 1 hour, so as to create reprocessed articles which can be further characterized according to the procedures herein, as well as others well known in this field, including: stress relaxation (using TA ARES-G2 rheometer using a 25 mm plate-plate geometry on samples with thickness of 1.5 mm); dilatometry (using the TA Instruments Q800 DMA apparatus in tension while applying heating rates of 5° C./min from 25 to 300° C.); dynamic mechanical analysis (DMA) (using TA Instruments Q800, operating in tensile mode with a constant frequency of 1 Hz at a strain amplitude of 0.05%, in order to determine the storage modulus (E) and glass transition temperature ($T_g$) (from the peak of the loss modulus) by scanning at 5° C./min from 0° C. to 200° C.); Fourier transform infrared spectroscopy (FTIR) (using a Perkin Elmer System series 2000 spectrophotometer in a spectral range of 4000650 $cm^{-1}$); UV and visible light spectra (using a V670 from Jasco Inc.); mechanical testing to produce stress-strain curves (via an Instron 1011 universal testing instrument in tensile mode); Small Angle X-ray Scattering (SAXS) (at room temperature on Rigaku MicroMax-002+ X-ray generator equipped with a Confocal Max-Flux optic and a microfocus X-ray tube source operating at 45.1 kV and 0.87 mA); differential scanning calorimetry (DSC) (using TA Instruments Q2000 with a heating rate of 5° C. $min^{-1}$ under nitrogen atmosphere); thermogravimetric analysis (TGA) (using TA Instruments Q500 with an aluminum pan); x-ray photoelectron spectroscopy (XPS) (via an Axis Ultra spectrometer from Kratos Analytical); swelling ratio and gel fraction via sol-gel; and cross-linking density (according to the rubber elasticity theory).

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A method for recycling a thermoset polymer material, the method comprising:
   selecting a thermoset waste polymer, said thermoset waste provided as particles and/or fragments;
   providing a catalyst to the thermoset waste polymer to create a recycling composition, wherein the catalyst is provided at less than 10.0 wt. % of a mass of the recycling composition; and
   milling the recycling composition in the presence of a milling media into vitrimer polymer, wherein the vitrimer polymer includes a dynamic recyclable network in which a portion of the catalyst forms ligands with a portion of the thermoset waste polymer.

2. The method according to claim 1 further comprising reprocessing the vitrimer polymer to form a recycled article including the thermoset polymer material.

3. The method according to claim 2 further comprising providing cellulose nanocrystals to the vitrimer polymer prior to the reprocessing.

4. The method according to claim 1 wherein the catalyst comprises zinc.

5. The method according to claim 1 wherein the catalyst comprises a metal salt including at least one of zinc, tin, magnesium, cobalt, calcium, titanium and zirconium.

6. The method according to claim 1 wherein the thermoset waste polymer is at least one selected from a polyester polymer, an epoxy/acid, an epoxy/anhydride, a polyurethane, a vinyl ester, and any combination of two or more thereof.

7. The method according to claim 1 wherein the thermoset waste polymer comprises a polyester based polyurethane, an epoxy, a polyester and/or any crosslinked polymeric network having: (i) ester groups on a backbone polymer chain, and (ii) hydroxyl (OH) groups.

8. The method according to claim 1 wherein the vitrimer polymer is formed as a fine powder.

9. The method according to claim 1 further comprising measuring a ratio of hydroxyl to ester groups in the thermoset waste polymer so as to determine an amount of catalyst required.

10. The method according to claim 9 wherein the ratio of hydroxyl to ester is at least 1:2 and less than 1:10.

11. The method according to claim 9 wherein the ratio of hydroxyl to ester is less than or equal to 1:1 and greater than 1:10.

12. A method for recycling a thermoset polymer material, the method comprising:
    selecting a thermoset waste polymer, said thermoset waste provided as particles and/or fragments;
    providing a catalyst to the thermoset waste polymer to create a recycling composition,
    milling the recycling composition in the presence of a milling media into vitrimer polymer, wherein the vitrimer polymer includes a dynamic recyclable network in which a portion of the catalyst forms ligands with a portion of the thermoset waste polymer;
    reprocessing the vitrimer polymer to form a recycled article including the thermoset polymer material; and
    providing cellulose nanocrystals to the vitrimer polymer prior to the reprocessing.

13. The method according to claim 12 wherein the catalyst comprises zinc or a metal salt including at least one of zinc, tin, magnesium, cobalt, calcium, titanium and zirconium.

14. The method according to claim 12 wherein the thermoset waste polymer is at least one selected from a polyester polymer, an epoxy/acid, an epoxy/anhydride, a polyurethane, a vinyl ester, and any combination of two or more thereof.

15. The method according to claim 12 wherein the thermoset waste polymer comprises a polyester based polyurethane, an epoxy, a polyester and/or any crosslinked polymeric network having: (i) ester groups on a backbone polymer chain, and (ii) hydroxyl (OH) groups.

16. The method according to claim 12 wherein the vitrimer polymer is formed as a fine powder.

17. A method for recycling a thermoset polymer material, the method comprising:
    selecting a thermoset waste polymer, wherein the thermoset waste polymer: (i) is provided as particles and/or fragments and (ii) comprises: (a) is at least one selected from at least one of a polyester polymer, an epoxy/acid, an epoxy/anhydride, a polyurethane, a vinyl ester, and any combination of two or more thereof, or (b) a polyester based polyurethane, an epoxy, a polyester and/or any crosslinked polymeric network having: (i) ester groups on a backbone polymer chain, and (ii) hydroxyl (OH) groups;
    providing a catalyst to the thermoset waste polymer to create a recycling composition; and milling the recycling composition in the presence of a milling media into vitrimer polymer, wherein the vitrimer polymer includes a dynamic recyclable network in which a portion of the catalyst forms ligands with a portion of the thermoset waste polymer.

18. The method according to claim 17 wherein the catalyst comprises zinc or a metal salt including at least one of zinc, tin, magnesium, cobalt, calcium, titanium and zirconium.

19. The method according to claim 17 wherein the vitrimer polymer is formed as a fine powder.

20. The method according to claim 17 further comprising measuring a ratio of hydroxyl to ester groups in the thermoset waste polymer so as to determine an amount of catalyst required.

21. The method according to claim 20 wherein the ratio of hydroxyl to ester is at least 1:2 and less than 1:10.

22. The method according to claim 20 wherein the ratio of hydroxyl to ester is less than or equal to 1:1 and greater than 1:10.

23. A method for recycling a thermoset polymer material, the method comprising:
   selecting a thermoset waste polymer, said thermoset waste provided as particles and/or fragments;
   providing a catalyst to the thermoset waste polymer to create a recycling composition;
   milling the recycling composition in the presence of a milling media into vitrimer polymer, wherein the vitrimer polymer includes a dynamic recyclable network in which a portion of the catalyst forms ligands with a portion of the thermoset waste polymer; and
   measuring a ratio of hydroxyl to ester groups in the thermoset waste polymer so as to determine an amount of catalyst required.

24. The method according to claim 23 wherein the catalyst comprises zinc or a metal salt including at least one of zinc, tin, magnesium, cobalt, calcium, titanium and zirconium.

25. The method according to claim 23 wherein the vitrimer polymer is formed as a fine powder.

26. The method according to claim 23 wherein the ratio of hydroxyl to ester is at least 1:2 and less than 1:10.

27. The method according to claim 23 wherein the ratio of hydroxyl to ester is less than or equal to 1:1 and greater than 1:10.

* * * * *